July 6, 1926.  
C. W. BECK  
STEERING WHEEL  
Filed April 20, 1925
1,591,269
2 Sheets-Sheet 2
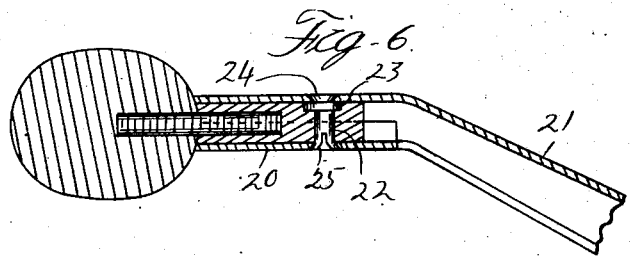
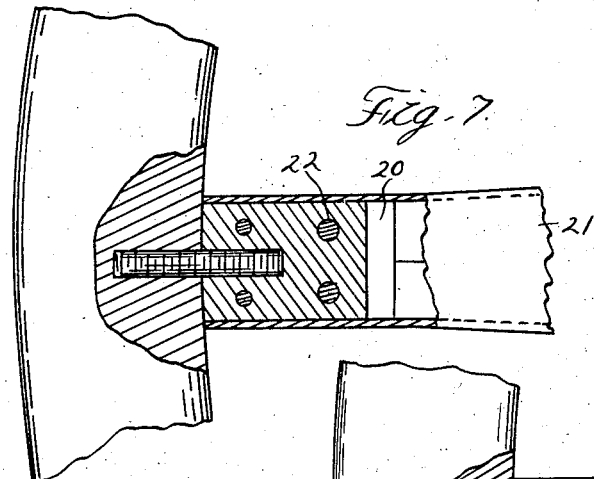
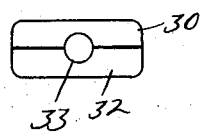
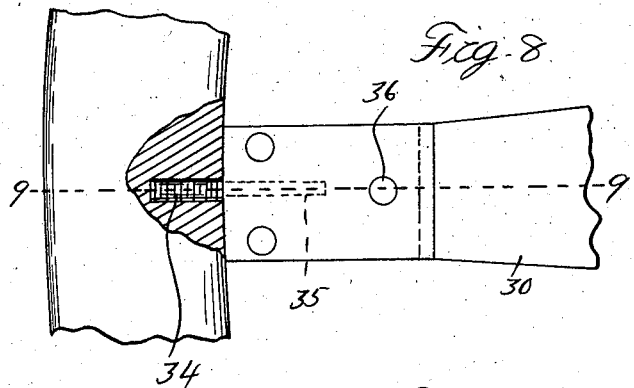
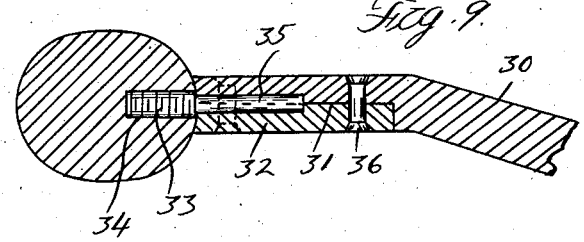
Inventor  
Charles W. Beck.  
By Whittemore Hulbert Whittemore  
Belknap  Attorneys Patented July 6, 1926.

1,591,260

UNITED STATES PATENT OFFICE.

CHARLES W. BECK, OF TOLEDO, OHIO, ASSIGNOR TO BECK-FROST CORPORATION, OF DETROIT, MICHIGAN, A CORPORATION OF MICHIGAN.

STEERING WHEEL.

Application filed April 20, 1925. Serial No. 24,595.

This invention relates generally to wheels and refers more particularly to steering wheels of the built-up type that are designed for use in connection with motor vehicles, boats and the like.

One of the essential objects of the invention is to provide a simple connection between the rim and the arms of the spider which will permit these parts to be assembled after they have been completely finished and polished.

Another object is to provide a connection between the spider and rim which may be easily and quickly made without marring either of these parts.

A further object is to provide a strong and durable wheel that is simple in construction and can be manufactured at a comparatively low cost.

With the above and other objects in view the invention consists in certain novel features of construction, combinations and arrangements of parts as will be more fully described and particularly pointed out in the appended claims.

In the accompanying drawings:—

Figure 1 is a top plan view of a wheel embodying my invention.

Figure 2 is a fragmentary vertical sectional view therethrough.

Figure 3 is an enlarged fragmentary sectional view through the outer end portion of one of the spider arms.

Figure 4 is a sectional view taken on the line 4—4 of Figure 2.

Figure 5 is a detail perspective view of the lock plate.

Figure 6 is a vertical sectional view through a slightly modified form of construction.

Figure 7 is a horizontal sectional view through the construction shown in Figure 6.

Figure 8 is a top plan view of another modified form of construction.

Figure 9 is a vertical sectional view taken on the line 7—7 of Figure 8.

Figure 10 is an end view of the construction shown in Figure 8.

In the present state of the art, spiders for steering wheels are usually formed of metal and are secured to rims that are usually formed of wood. Such wheels are then finished by being painted or enameled. When wooden rims are used the drying of the paint or enamel must be effected at a comparatively low temperature, otherwise the rims are likely to be damaged. As a result the wheels cannot be baked, consequently the exterior finish of the metal spiders is not as desirable as it would otherwise be if they were subjected to a higher temperature. With the present invention, the spider and rim may be finished separately and subsequently assembled. This is accomplished by a very simple connection which may be easily and quickly made between the rim and spider arms without marring the finish of these parts.

Referring now to the drawings in which like characters of reference designate corresponding parts throughout the several views, the numeral 1 designates a steering wheel embodying my invention having a built-up spider 2 and a rim 3. As shown, the spider 2 preferably includes a cast hub piece 4 and a plurality of radially extending sheet metal arms 5. These arms are preferably hollow in form and may be secured in any suitable manner to the hub piece 4, the connection shown being similar to that set forth in my copending application filed Nov. 6, 1924, Serial Number 748,141.

In order that the spider 2 and rim 3 may be finished and polished and subsequently assembled without being marred or otherwise damaged, I preferably provide suitable headless screws 6 that threadedly engage suitable bushings 7 and blocks 8, carried respectively by the rim 3 and spider arms 5. As shown, the bushings 7 are firmly anchored in the rim 3 and terminate at the inner edge thereof, while the blocks 8 are received by the hollow spider arms 5. These blocks may be formed of any suitable material such as rubber, composition or wood and preferably fit snugly within the arms 5 and bear against the bushings 7 when the parts are assembled. To facilitate assembly of these parts, the spider arms 5 are preferably provided at their outer ends with longitudinally extending recesses 9 which will permit the blocks 8 to be received by parts, and a connection between the rim and arm including a member projecting inwardly from the rim having a portion held between the parts aforesaid of said spider arm.

10. In a steering wheel, the combination with a rim, of a spider arm having a recess, and a separate part secured in said recess, and a connection between said rim and spider arm including a member having one portion fixed in the rim and having another portion held by the part aforesaid in the recess in said arm.

In testimony whereof I affix my signature.

CHARLES W. BECK.

Patented July 6, 1926.

1,591,270

UNITED STATES PATENT OFFICE.

HENRY BLUMENBERG, JR., OF LOS ANGELES, CALIFORNIA, ASSIGNOR TO STOCK-HOLDERS SYNDICATE, OF LOS ANGELES, CALIFORNIA, A CORPORATION OF CALIFORNIA.

PROCESS OF MAKING FERTILIZER.

No Drawing. Application filed May 12, 1925. Serial No. 29,844.

My invention relates to a process of making a fertilizer, and has for its object to provide a simple, efficient and economic process whereby a fertilizer material rich in phosphates and nitrates is produced.

My invention consists in the steps of the process hereinafter described and claimed.

I take crude phosphate rock $Ca_3(PO_4)_2$ and calcium nitrate and mix the same in the presence of water and charge the mixture with sulphur dioxide, which produces calcium sulphite and nitric acid, which in turn will attack crude phosphate rock and produce calcium nitrate and phosphoric acid. The phosphoric acid will again react on the crude phosphate rock and produce acid calcium phosphate in accordance with the following equations:

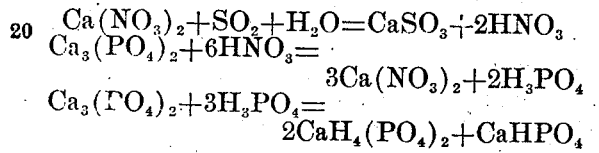

The mixture is evaporated to dryness and forms a hygroscopic mass due to the presence of the calcium nitrate and calcium phosphates. Sufficient amount of powdered quick lime, CaO, is added to the mixture to form a dry powder, which forms an excellent fertilizing material.

This process reaches an efficiency of 95% of converting the crude phosphate rock to calcium nitrate and calcium phosphates.

If desired the insoluble matter composed of impurities of the phosphate rock may be filtered off.

In place of the calcium nitrate the nitrates of the alkali metals may be used, such as sodium nitrate or potassium nitrate or any other metal nitrates. The resulting product will then contain in place of the calcium nitrate the corresponding alkali metal nitrates and other metal nitrates respectively.

Various changes may be made in the steps of the process by those skilled in the art without departing from the spirit of my invention, as claimed.

I claim:

1. A process of making a fertilizer comprising mixing finely ground phosphate rock with calcium nitrate in the presence of water and charging the mixture with sulphur dioxide thereby producing fertilizing material containing calcium nitrate and large percentages of soluble calcium phosphates, evaporating to dryness and adding powdered quick lime to make a dry powder.

2. A process of making a fertilizer comprising mixing finely ground phosphate rock with calcium nitrate in the presence of water and charging the mixture with sulphur dioxide thereby producing fertilizing material containing calcium nitrate and large percentages of soluble calcium phosphates and evaporating to dryness.

3. A process of making a fertilizer comprising mixing finely ground phosphate rock with a metal nitrate in the presence of water and charging the mixture with sulphur dioxide, thereby producing fertilizing material containing the metal nitrates and large percentages of soluble calcium phosphates and evaporating to dryness.

In testimony whereof I have signed my name to this specification.

HENRY BLUMENBERG, Jr.